J. W. LINN.
MOTOR TRUCK.
APPLICATION FILED DEC. 29, 1910.
1,045,992.
Patented Dec. 3, 1912.
4 SHEETS—SHEET 1.
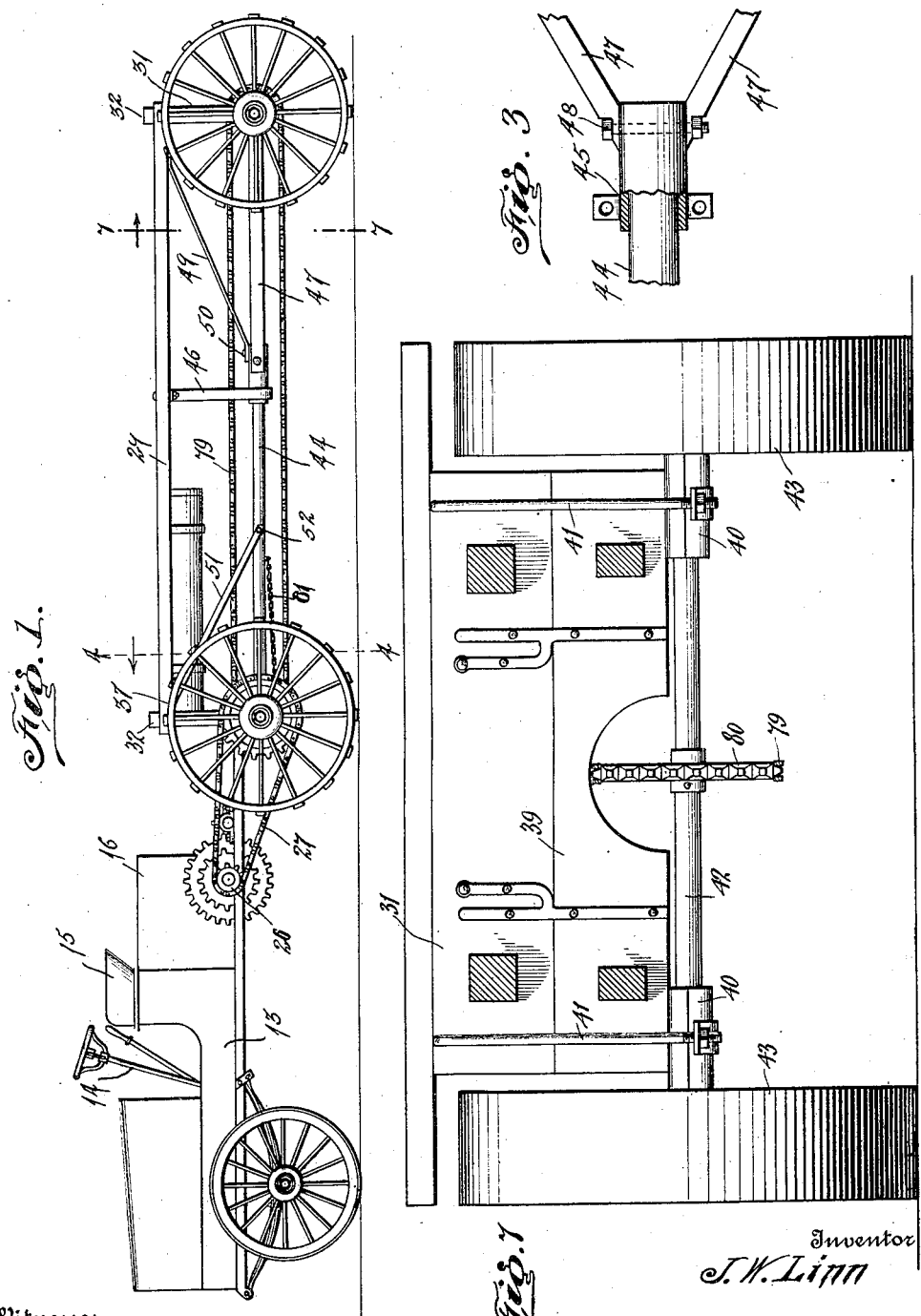

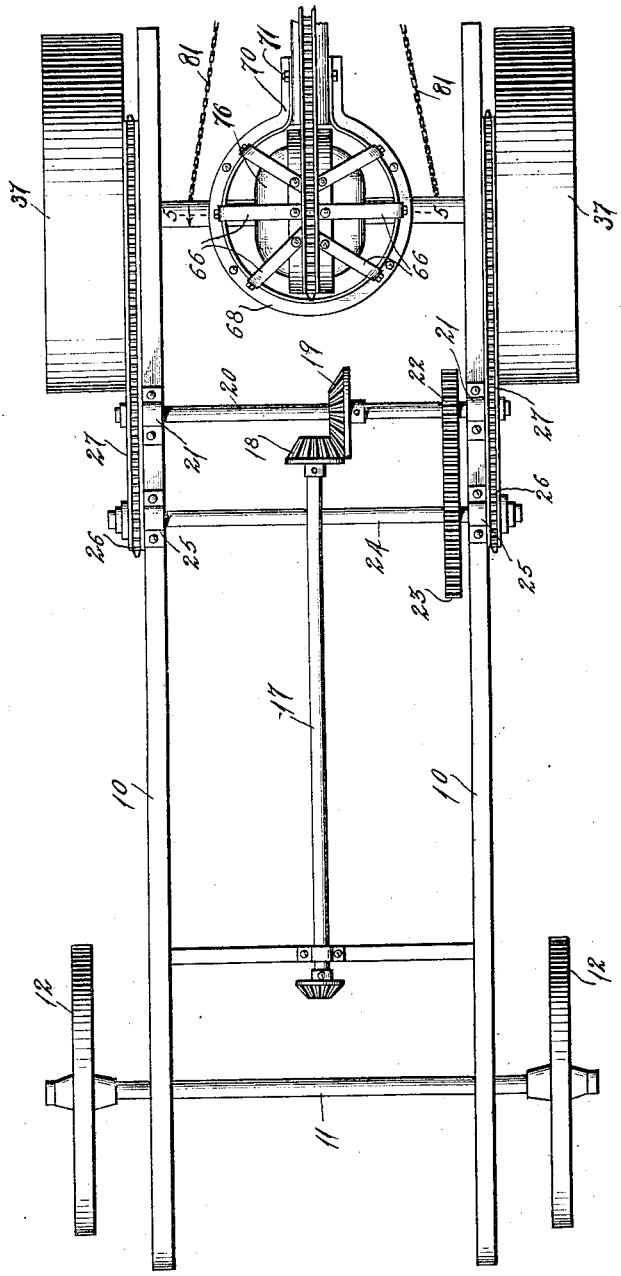

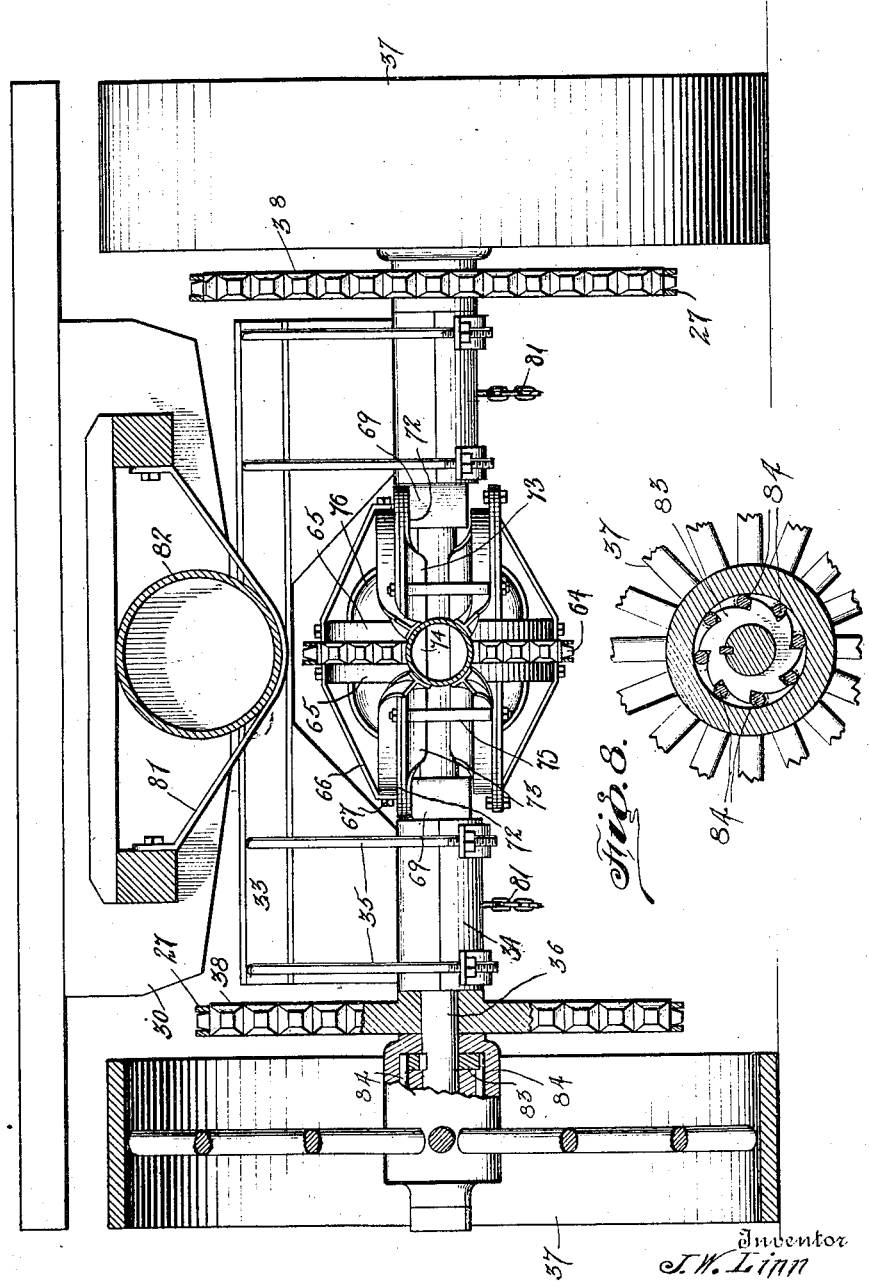

J. W. LINN.
MOTOR TRUCK.
APPLICATION FILED DEC. 29, 1910.

1,045,992.

Patented Dec. 3, 1912.
4 SHEETS—SHEET 4.

Inventor
J. W. Linn

Witnesses
Francis Boyle

UNITED STATES PATENT OFFICE.

JAMES W. LINN, OF OREGON CITY, OREGON.

MOTOR-TRUCK.

1,045,992.  Specification of Letters Patent.  Patented Dec. 3, 1912.

Application filed December 29, 1910.  Serial No. 599,835.

*To all whom it may concern:*

Be it known that I, JAMES W. LINN, a citizen of the United States, residing at Oregon City, in the county of Clackamas, State of Oregon, have invented certain new and useful Improvements in Motor-Trucks; and I do hereby declare the following to be a full, clear, and exact description of the invention, such as will enable others skilled in the art to which it appertains to make and use the same.

This invention relates to motor vehicles of that general class in which a fore-wagon is operatively combined with a truck, the fore-wagon carrying the transmission gearing.

The object of the present invention is to provide a novel ball and socket connection between the reach of the truck and forward axle thereof, this connection carrying a transmission gear which is maintained in alinement with the reach at all times during swinging of the vehicle around corners.

A further object of the invention is to provide a flexible connection between the reach and rear hounds of the vehicle so that either of the rear wheels may sink into a rut or advance over an obstruction without straining the reach.

Figure 5:
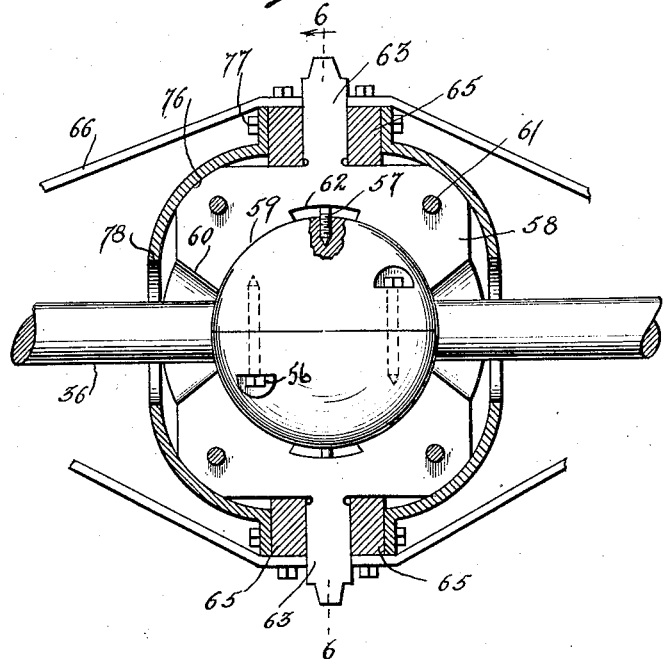
Figure 6:
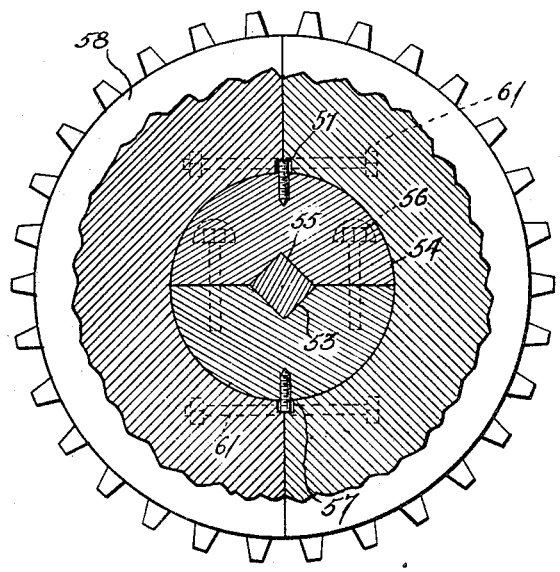

In the accompanying drawings, forming part of this specification: Figure 1 is a side elevation of the motor vehicle. Fig. 2 is a plan view of the forward portion of the vehicle including the intermediate supporting wheels and ball and socket joint. Fig. 3 is a fragmentary plan view of the rear portion of the vehicle, showing the flexible connection between the rear hounds and reach. Fig. 4 is an enlarged transverse sectional view taken on the line 4—4, Fig. 1. Fig. 5 is an enlarged cross sectional view taken on the line 5—5, Fig. 2. Fig. 6 is a cross sectional view taken on the line 6—6, Fig. 5. Fig. 7 is a cross sectional view taken on the line 7—7 Fig. 1. Fig. 8 is a fragmentary sectional view showing one of the traction wheel ratchets.

Like characters of reference designate similar parts in the views shown.

Referring now to the drawing, the vehicle is seen to comprise a fore-wagon and a truck, the two having a common intermediate set of wheels. The chassis of the fore-wagon is shown in Fig. 2 with parts removed and is seen to include side rails 10 upon the forward end portions of which is arranged an axle 11, the same being equipped at its opposite ends with supporting wheels 12. Supported upon the side rails is a body 13, upon the forward end of which is supported the engine (not shown) and controlling mechanism 14, and upon the rear end of which is supported a driver's seat 15. The driving shaft 17 is connected at its forward end with the engine in any suitable manner and at its rear end is equipped with a bevel gear 18 which meshes with a bevel gear 19 arranged upon a transverse shaft 20, the opposite ends of which are journaled in suitable bearings 21 arranged upon the side rails. This shaft is equipped with a spur gear 22 which meshes with a compensating gear 23 carried by a transverse shaft 24 which is journaled in suitable bearings 25 carried upon the side rails in advance of the first named bearings 21. The ends of this shaft extend considerably beyond the side rails and are equipped with spur gears 26 over which are trained endless chains 27. These chains are trained over spur gears carried by the axle intermediate traction wheels as will presently be described.

The truck comprises side rails 29, the forward ends of which are inserted in suitable openings formed in a bolster 30 and the rear ends of which are inserted in suitable openings formed in a bolster 31. Cross bars 32 are arranged across the leading and rear ends of the bolsters and form means for supporting a platform. Secured to the forward bolster in any preferred manner is an axle-tree 33, the inner face of which is concave adjacent its opposite ends and seats tubular bearings 34, these bearings being secured to the axle-tree by means of clips 35 as shown.

Mounted for rotation in the bearings 34 is an axle 36, the opposite ends of which are equipped with supporting wheels 37, each supporting wheel having a ratchet connection with the axle as will presently be described. A spur gear 38 is keyed adjacent to each wheel hub and is disposed in alinement with the adjacent spur gear 26 carried by the fore-wagon and engages the endless link chain 27 carried by said gear. It is clear that through the instrumentality of the link chains and gears the supporting wheels and axle are both rotated simultaneously.

Fixed to the rear bolster 31 is an axle-tree 39, this axle-tree being fixedly secured to the bolster in any preferred manner and having its lower face concave adjacent its opposite ends to form seats for cylindrical bearings 40, these bearings being secured to the axletree by means of clips 41 as shown. Mounted in the bearings is an axle 42, the opposite ends of which are equipped with supporting wheels 43, these supporting wheels being fixedly secured to the axle in any preferred manner.

Arranged to connect the front and rear axles is a reach 44, this reach being formed from a single length of tubing, one end of which is slidingly fitted in the bore of a sleeve 45, this sleeve being suspended from the rails 29 by means of a U-shaped strap hanger 46. A pair of hounds 47 are clamped by means of clevises or similar devices 48 to the rear end portion of the sleeve and at their rear ends the hounds are fixedly secured in any preferred manner to the rear axle-tree 39. By this construction either of the rear supporting wheels may drop into a rut or advance over an obstruction without distorting the reach, since the sleeve may rotate on the reach to a slight extent. A pair of inclined brace rods 49 are connected at their rear ends to the rear bolster and at their forward ends are bolted to the sleeve as shown at 50. A similar pair of inclined brace rods 51 are loosely connected at their forward ends to the front bolster 30, and at their rear ends are bolted to the reach as shown at 52.

The means for permitting of the reach and rails of the truck to swing in rounding a curve will now be described. The middle portion of the front axle 36 is preferably square as shown at 53 and upon this square portion of the axle is mounted a ball 54, the same comprising a pair of similar halves provided axially with angular openings 55 designed to receive the squared portion of the axle, these halves being secured together by means of lag screws 56 or similar means. Threaded into the periphery of each half at diametrically opposite points is a pair of pins 57. Mounted on the ball is a sprocket gear 58, the same comprising two similar halves, the body portions of which are preferably formed approximately square in contour and are provided centrally with concaved faces 59 which receive the surface of the ball and are further provided with axial frusto-conical shaped openings 60, through which the axle 36 projects, these openings permitting of the axle swinging slightly when the vehicle is rounding a curve. It will be understood that during the swinging movement of the axle that the ball will swing within the concaved surfaces of the halves. The halves are secured together by means of bolts or similar devices 61.

Although the axle has been described as having a squared portion and the ball as being formed in two pieces, it is not intended to limit the construction to this particular form as the axle may be made round and the ball may be cast in a single piece without departing from the spirit of the invention.

Formed in the concaved surface of each gear half is a slot 62, this slot receiving the adjacent pin 57 of the ball. It will be understood that when the ball is swinging within the gear that these pins by coming into contact with the end walls of the slot limit the swinging movement of the ball and consequently the swinging movement of the axle. It is clear that the gear by virtue of the pins engaging in the slots will be rotated simultaneously with the rotation of the ball when the axle is rotated through the instrumentality of the gears 38.

The corners of the body portion of the gear halves are rounded as shown at 63, the object of which will presently appear. The teeth 64 of the gear halves are preferably formed with rectangular base portions, these portions bearing against guide members hereinafter described and causing the sprocket gear while rotating to remain constantly in alinement with the reach regardless of the swinging movement of the axle.

The guide members consist of a pair of parallel rings 65, these rings being arranged on opposite sides of the bases 63 of the sprocket teeth and bearing with their inner faces against the outer faces of said bases. The guide rings are anchored in position by means of angular brace rods 66, each of these brace rods being fixed at one end to the adjacent ring and having its outer end bolted or otherwise rigidly secured as shown at 67 to a split ring 68. There are two of the split rings, one arranged above the axle and the other arranged below the axle, the intermediate portions of these rings slidingly fitting upon square blocks 69 carried upon the axle, these blocks having axial openings for the loose reception of the axle. The terminals of each ring are bent outwardly as shown at 70 and bolted or otherwise secured as shown at 71 to the leading end of the reach. Each ring is preferably formed of T iron as shown and it will be observed that by means of these rings that the guide rings 65 are rigidly held in engagement with the side faces of the sprocket teeth bases, and since the split rings are fixed at their terminals to the reach it is evident that the sprocket gear will at all times be held in alinement with the reach regardless of the swinging of the axle in rounding a curve. Wear plates 72 are interposed between the opposing faces of the split rings and square blocks 69, these wear plates being circular in outline and having downturned lips 73 which overhang the axle and present surfaces 74 that register with the bore of the reach.

these surfaces forming stops that prevent the reach from accidental engagement with the teeth of the sprocket gear when mounting. Bolts 75 are passed vertically through the split rings and rigidly secure the same together.

A housing 76 is mounted on the body portion of the sprocket gear, this housing being made in two similar halves, each half being substantially semicircular in outline and being provided on its outer edge with an out-turned foot which is bolted or otherwise secured as shown at 77 to the outer face of the guide ring. Each half is further provided axially with a circular opening 78 which registers with the outer edge of the adjacent frusto-conical opening 60 of the body portion of the gear 58 and permits of the axle, as above stated, swinging within the body portion of the gear.

It is evident that should the reach be permitted to travel until the pins carried by the ball engage the ends of the slots in the sprocket body that these pins would in time be injured beyond repair and to prevent this, a pair of chains, cables or the like as shown at 81 are engaged at their forward ends upon the bearings 34 and are secured at their rear ends to the reach, these chains being sufficient length to permit of the reach turning until the pins are nearly in engagement with the ends of the slots. These chains by thus limiting the movement of the reach promote the long life of the pins. An endless link chain 79 is trained over the gear 58 and a gear 80 arranged upon the rear axle 42. By virtue of the ball and socket connection between the intermediate axle and reach the chain will at all times be maintained in the vertical plane of the reach. Suspended by means of strap hangers 81 from the truck side rails is a reservoir 82 which may be filled with gasolene or like fuel for supplying the engine carried by the fore-wagon.

It will be seen from the above description that a vehicle has been provided which will permit of the rear wheels dropping into ruts or advancing over obstructions without straining the reach and further that by the novel ball and socket connection between the forward end of the reach and the intermediate wheel axle that the reach and rear portion of the truck may swing in rounding a curve without distorting the axle in any manner. Further, it will be observed that by means of the chains 81, the pins are prevented from traveling in the slots to the limit of movement so that the long life of the pins is promoted and it further will be observed that by forming the sprocket wheel and balls as above described, the pins may be readily removed when worn and replaced with new ones.

In order that the traction wheels of the truck may adjust themselves when the truck is swinging around a curve, a ratchet wheel 83 is arranged within the hub of each traction wheel and is keyed to the axle. A plurality of rollers 84 surrounds the ratchet wheel, these rollers binding against the teeth of the wheel and confronting inner wall of the hub during rotation of the axle. Now it is evident that in swinging around a turn the traction wheels on one side of the truck will move at the same rate as the axle, while the traction wheels on the opposite side of the truck must move at a faster rate than the axle.

When the wheels rotate faster than the axle the rollers will drop into the valleys of the teeth and out of frictional engagement with the wheel so that the wheel may rotate independently and faster than the axle. Although this specific form of ratchet is shown it is evident that modifications may be made in the construction of the ratchet without sacrificing any of the advantages of the invention.

What is claimed is:—

1. The combination of a dirigible motor vehicle, an engine in said motor vehicle, a trailer having a forward axle forming the rear axle of said motor vehicle, and having a rear axle, a reach formed in sections adapted to rotate independently of each other whereby the rear axle is adapted to swing independently of said forward axle, a ball fixed to said forward axle, a gear on said ball adapted to have a laterally shifting movement thereon and adapted to be rotated thereby, a gear on said rear axle, and an endless connector trained over said gears maintained at all times in alinement with the reach through the instrumentality of the laterally shiftable gear on said forward axle.

2. The combination of a dirigible motor vehicle, a trailer having a forward axle forming the rear axle of the motor vehicle, and having a rear axle, a reach formed of sections swivelly connected together and connecting the trailer forward and rear axles, a ball on said forward axle adapted to rotate therewith, a gear on said ball, interlocking means between said gear and said ball permitting of the gear being rotated by said ball while at the same time permitting of the gear shifting laterally upon said ball, a gear on said rear axle, and an endless connector connecting said gears and maintained at all times in alinement with said reach through the instrumentality of said gear and ball connection on said forward axle.

3. The combination of a dirigible motor vehicle, a motor thereon, a trailer, said trailer having a forward axle forming the rear axle of said motor vehicle, a power transmission means between said motor and said forward axle, a rear axle, a reach connected to said rear axle and equipped at its forward end with guide members encircling said forward axle, a gear fixed on said rear axle, a gear fixed on said forward axle arranged to rotate between said guide members, an endless connector trained over said gears, said forward gear having a body portion provided with a concave circular seat, a ball fixed to said forward axle and fitting in said seat, and means carried by the ball for simultaneously rotating and permitting of a swivel movement of said gear, whereby to maintain said gears in alinement during turning movement of the vehicle.

In testimony whereof, I affix my signature, in presence of two witnesses.

JAMES W. LINN.

Witnesses:
N. SWAFFORD,
B. F. LINN.

---

Copies of this patent may be obtained for five cents each, by addressing the "Commissioner of Patents, Washington, D. C."